United States Patent [19]
Ksioszk et al.

[11] Patent Number: 5,158,225
[45] Date of Patent: Oct. 27, 1992

[54] BACKING TOOL FOR WELDING

[76] Inventors: Robert G. Ksioszk, 4929 Maple Rd.; Steven W. Gundrum, 7785 Hwy. 144N, both of West Bend, Wis. 53095

[21] Appl. No.: 643,278

[22] Filed: Jan. 22, 1991

[51] Int. Cl.$^5$ .................................................. B23K 5/22
[52] U.S. Cl. ...................................... 228/50; 228/216; 269/3; 219/160
[58] Field of Search ..................... 228/50, 216, 222, 57, 228/22, 125; 81/30, 426.5, 424.5, 426, 420; 269/1, 3, 6; 29/270; 219/160; 294/7, 49

[56] References Cited

U.S. PATENT DOCUMENTS

| | | | |
|---|---|---|---|
| 2,449,371 | 9/1948 | Dutch | 219/160 |
| 3,202,023 | 8/1965 | Parker | 81/426.5 |
| 3,273,881 | 9/1966 | Kiefer | 228/57 |
| 3,908,490 | 9/1975 | Durham | 81/426.5 |
| 4,139,930 | 2/1979 | Cox | 81/26 |
| 4,197,611 | 4/1980 | Bell et al. | 16/116 R |
| 4,205,219 | 5/1980 | Snell | 219/160 |
| 4,662,252 | 5/1987 | Warheit | 81/385 |
| 4,747,588 | 5/1988 | Dillhoff | 269/6 |

Primary Examiner—Richard K. Seidel
Assistant Examiner—James Miner
Attorney, Agent, or Firm—Andrus, Sceales, Starke & Sawall

[57] ABSTRACT

A hand held backing plate tool for the welding repair of holes in sheet metal panels includes a demountable backing plate which may be selected with a size and shape adapted to fit the contour of the panel adjacent the hole to be repaired. The selected backing plate is demountably attached to an insulated handle for convenient positioning by the repairman during repair. The backing plate is made of a copper base alloy to which welding metal will not adhere. The handle is made of a lightweight aluminum core including a heat transfer barrier and the outer surface of the handle is covered with an insulated hand grip. In an alternate embodiment, a mounting block is attached to one jaw of a C-clamp adjustable locking wrench to which the same variety of packing plates may be demountably attached. The locking wrench allows clamping the backing plate in position in some applications.

3 Claims, 3 Drawing Sheets

BACKING TOOL FOR WELDING

BACKGROUND OF THE INVENTION

The present invention pertains to welding tools and, more particularly, to a hand held backing tool for use in the repair of holes in sheet metal panels.

In repairing holes in sheet metal panels by welding, particularly thin metal automotive body panels, only a relatively thin layer of weld metal is required. However, the hole to be filled must be backed with a large metal patch or with some type of plate which is held in place until the welding process is completed. If a patch is used, the weld metal adheres to it as well as to the edge of the hole and the patch becomes a permanent part of the repair. If a plate is used, it must have a surface which conforms to the inside surface of the panel to be repaired and covers the hole therein. In addition, the plate must be attached or held in a manner to maintain it in position while the welding process is carried out. It is known in the prior art to hold a piece of metal against the backside of a hole in a panel to be closed by welding. However, finding a piece of metal of the right size and shape and comprising a material to which the weld metal will not adhere is often difficult. In addition, positioning and holding the piece of metal is often cumbersome and tedious. The wide variety of hole shapes and sizes and body panel contours encountered in auto body repair simply compounds the problems associated with the use of metal backing members.

U.S. Pat. No. 2,584,072 shows a backup plate which is demountably attached to the panel to be repaired by a magnet which spans the hole. However, this device does not lend itself well to easy repositioning as the hole is filled, for example, along an elongated crack or the like. In addition, although backing plates of different shapes are disclosed along with magnets of corresponding varying shapes, to provide complete assemblies to accommodate a wide variety of auto body panel contours would be prohibitively expensive.

U.S. Pat. No. 3,273,881 discloses a welding device for the repair of auto body panels which assists in positioning and initially holding a permanent backing patch until it can be tacked in position. As previously indicated, the patch becomes a permanent part of the repair.

U.S. Pat. No. 2,449,371 shows a hand operated backing tool for positioning a backing plate along the portion of the inside cylindrical surfaces of two pipe ends to be joined by a continuous welded seam. The tool is particularly constructed for use with pipe ends spaced axially apart so the backing plate can be inserted through the gap between the ends, moved progressively around the circumference of the pipe ends as the weld bead is laid down, and removed from the gap before the seam is fully completed. This tool is essentially a single purpose device with limited utility.

U.S. Pat. No. 1,902,051 also shows a backing plate holder for use in welding circular pipe sections. The device is intended to be secured in position inside the pipe and is adapted for use in making either circumferential or axial welded seams.

There remains a real need in the welding art, particularly in the auto body repair industry, for a simple weld backing plate device which is convenient to use, readily adaptable or convertible to varying auto body panel contours and hole sizes, and of relatively inexpensive construction.

SUMMARY OF THE INVENTION

The present invention comprises a hand held welding tool which is particularly adapted for use as a backing plate in the repair holes in sheet metal panels and which is readily adaptable to the wide range of body panel contours typically encountered in the auto body industry. The tool includes a backing plate which has a smooth heat resistant surface with a shape that conforms to the surface of the metal panel and is sized to bridge at least a portion of the hole in the panel to be repaired by filling the same with weld metal. A handle is attached to one edge of the backing plate to facilitate manual positioning of the plate and for holding it against the surface of the panel. The backing plate is demountably attached to the handle by a removable fastener so that other backing plates of different sizes or shapes may be easily attached to the handle.

The backing plate is preferably made of metal and the metal is selected from those to which weld metal will not adhere. Preferably, the backing plate metal is a copper base alloy such as brass. The backing plate may be of any size and/or shape required by the contour of the body panel and the size of the hole, but is preferably made from a relatively thin but rigid metal sheet.

The handle includes a metal core which is attached at one end to the backing plate, and an insulating hand grip which covers the opposite end of the metal core. The removable fastener may conveniently include a screw extending through a mounting hole in the edge of the backing plate and secured in a tapped hole in the end of the handle.

The metal core is made of aluminum in a preferred embodiment and includes a heat transfer barrier positioned between the attachment to the end plate and the hand grip. The heat transmission barrier may conveniently comprise a circumferential annular recess formed in the metal core. The recess is disposed beneath the hand grip and near the end where the core is attached to the backing plate.

In another embodiment, the tool handle comprises an adjustable locking wrench in which one jaw of the wrench is attached to the backing plate. The attachment preferably includes a removable fastener which comprises a mounting block attached to the jaw and a threaded fastener for attaching the backing plate to the mounting block. The mounting block is preferably adapted to utilize the same variety of backing plate sizes and shapes used with the handle of the preferred embodiment.

DETAILED DESCRIPTION OF THE PREFERRED EMBODIMENTS

Figure 1:
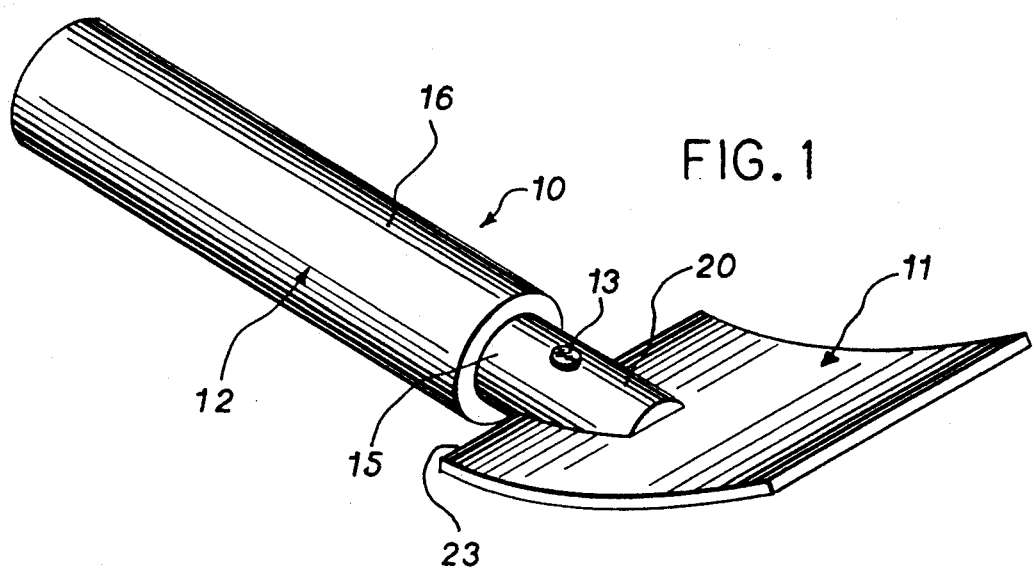
FIG. 1 is a perspective view of one embodiment of the tool of the present invention.
Figure 2:
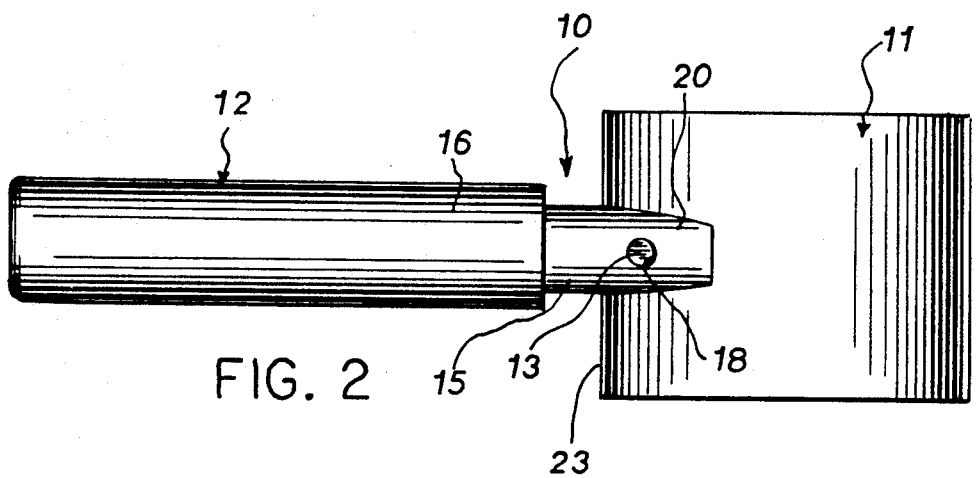
FIG. 2 is a top plan view of the tool shown in FIG. 1.
Figure 3:
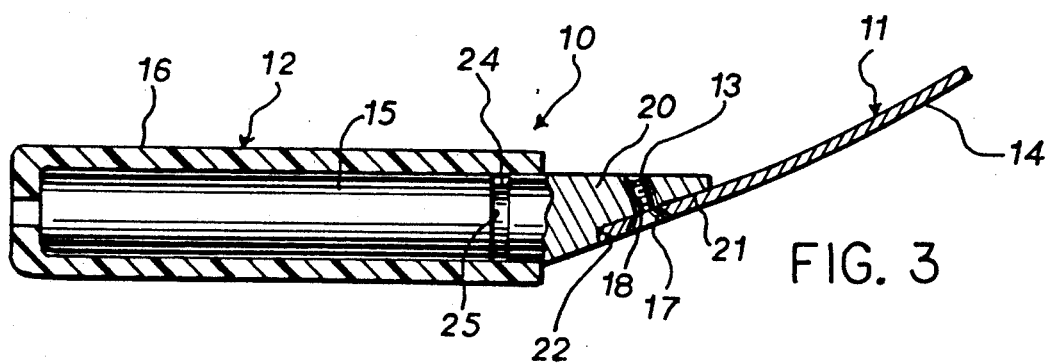
FIG. 3 is a sectional view taken on line 3—3 of FIG. 2.

Referring initially to FIGS. 1-3, a welding tool 10 of one embodiment of the present invention includes a backing plate 11 and a handle 12 attached to one edge of the plate by a mounting screw 13. The backing plate 11 includes a smooth surface 14 having, in this embodiment, a curved shape which conforms to the surface of a metal panel in which a hole is to be filled by welding from the opposite side, all in a known manner. The surface of the backing plate must be heat resistant and also made of a material to which the molten weld metal will not adhere as it hardens. For welding steel, a backing plate 11 may be made of copper or a high copper base alloy such as brass. The size and shape of the backing plate 11 may be varied considerably, as shown in the other embodiments in the drawings to be described hereinafter, but in all cases the backing plate must be rigid enough so it will not deflect in use, yet thin enough to keep the weight of the tool to a minimum and to save material. A copper or brass plate ⅛ in thickness has been found to be generally suitable.

The handle 12 includes a cylindrical metal core 15 most of the length of which is covered with an insulating hand grip 16. The mounting screw 13 includes a flat head which is received in a countersunk hole 17 through one edge of the backing plate 11 and received in a tapped hole 18 in the free uncovered end 20 of the metal core. The free end of the core is preferably machined to define a flat mounting surface 21 that terminates in an abutment 22 which is engaged by the edge 23 of the backing plate when it is secured in place by the mounting screw 13. The plane of the mounting surface 21 lies at an acute angle to the axis of the handle 12 to facilitate manual positioning by the user.

The metal core 15 of the handle is preferably made of solid aluminum stock although other metals would also be suitable. Aluminum is desirable because of its light weight, relatively low cost, easy machinability, and relatively lower heat transfer coefficient as compared to copper or brass. The aluminum core 15 is preferably provided with a heat transfer barrier 24 which, in the embodiment shown, comprises a circumferential annular recess 25 cut into the core closely adjacent the inner end of the hand grip 16 so that it is just covered thereby. It is known that an abrupt reduction in the cross section of a metal member helps reduce the transfer of heat and the annular recess 25 is thus located to reduce the transfer of heat to the end of the handle covered by the hand grip 16.

Figure 4:
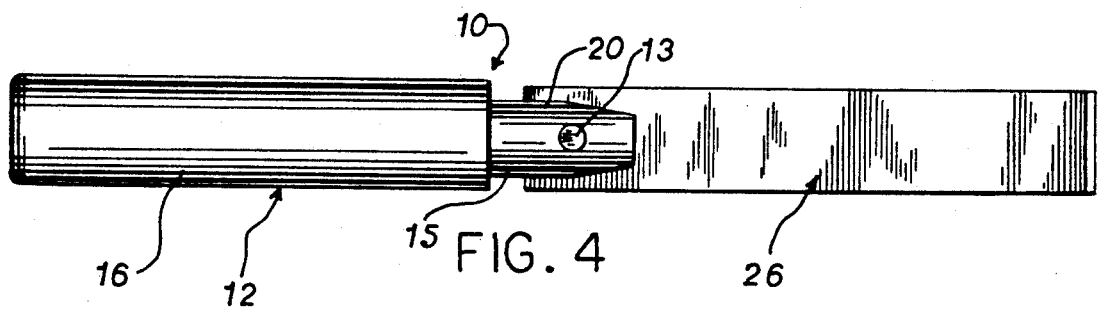
FIG. 4 is a top plan view similar to FIG. 2 showing an alternate construction of the backing plate.
Figure 5:
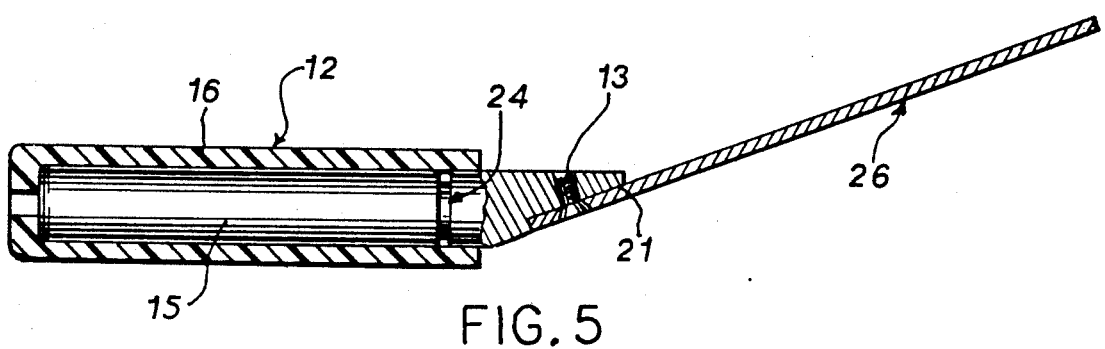
FIG. 5 is a sectional view taken on line 5—5 of FIG. 4.
Figure 6:
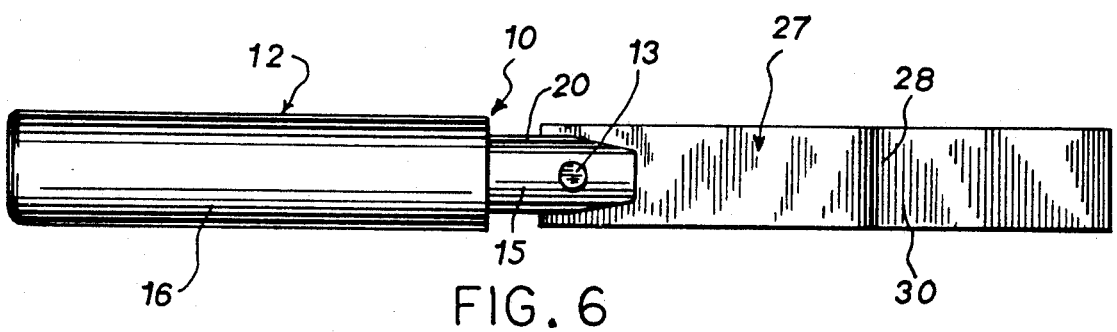
FIG. 6 is a top plan view of the tool showing another embodiment of the backing plate.
Figure 7:
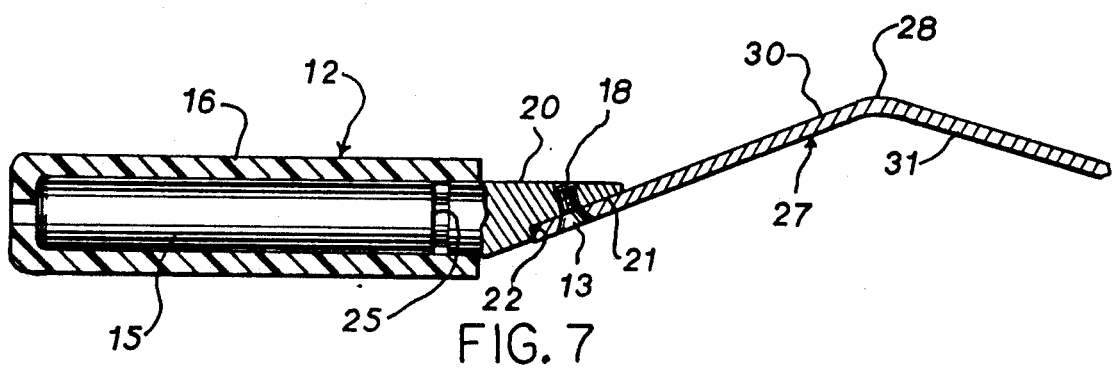
FIG. 7 is a sectional view taken on line 7—7 of FIG. 6.

FIGS. 4 and 5 and FIGS. 6 and 7, respectively, show substantially identical tools with backing plates of substantially different sizes and than those shown in FIGS. 1-3. The backing plate 26 of FIGS. 4 and 5 is flat and narrow, adapting it for use on most flat surfaces having a small hole or relatively narrow crack to be filled. The backing plate 27 in the embodiment shown in FIGS. 6 and 7 is of a size similar to backing plate 26, but includes a lateral bend 28 at approximately its midpoint. Backing plate 27 thus presents a convex backing surface 30 on the top side and a concave backing surface 31 on the bottom side.

The handle 12, including the construction of the metal core 15 and plate mounting surface 21, in the embodiments of FIGS. 4 and 5 and FIGS. 6 and 7 is identical to the embodiment of FIGS. 1-3 previously described. Identical reference numbers are used to identify these common components.

Figure 8:
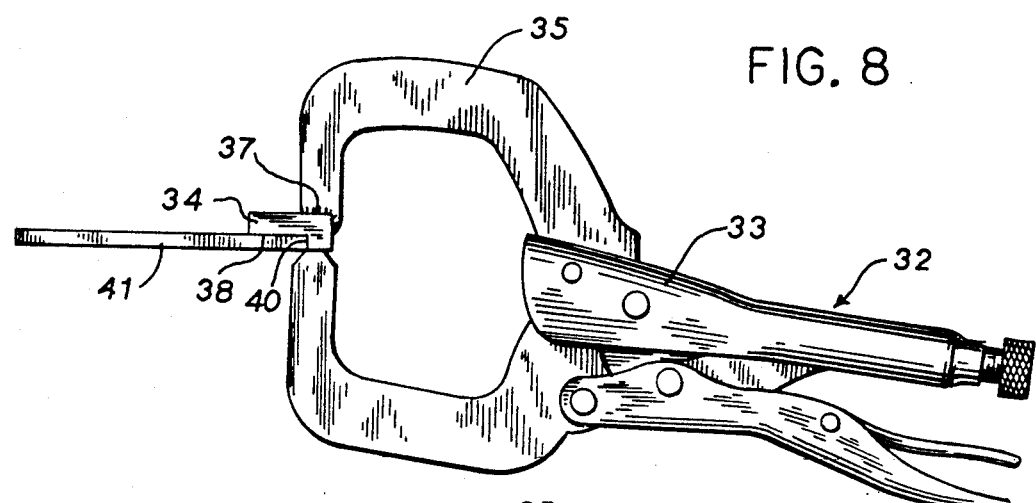
FIG. 8 is a side elevation of another embodiment of the invention.
Figure 9:
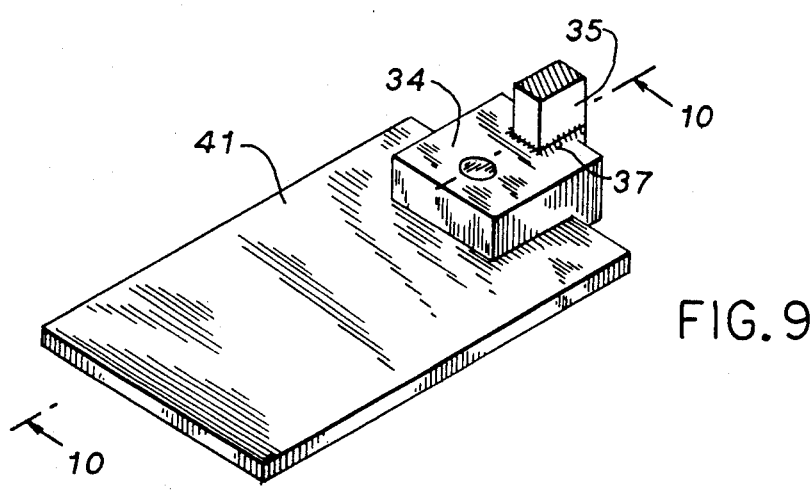
FIG. 9 is an enlarged perspective view of the backing plate and mounting assembly of the tool shown in FIG. 8.
Figure 10:
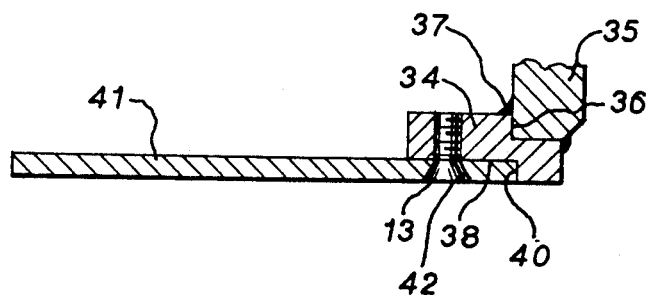
FIG. 10 is a sectional view taken on line 10—10 of FIG. 9.

In the embodiment shown in FIGS. 8-10, the tool handle 32 comprises a C-clamp adjustable locking wrench 33. In some cases, the shape of a body panel and the location of the hole therein to be filled allows the backing plate to be clamped against the surface, thereby freeing one hand of the repairman.

A plate mounting block 34 is attached to the end of one jaw 35 of the wrench 33. The mounting block 34 comprises a generally rectangular metal block, preferably machined from steel. One edge of the mounting block is provided with a relatively shallow recess 38 sized to receive the end of the jaw 35 which is welded therein, as by a welded joint 37. The opposite surface of the mounting block 34 is provided with a mounting surface 38 and abutment 40, similar to the mounting surface 21 and abutment 22 in the handles of the previously described embodiments. A backing plate 41 having a countersunk hole 42 is mounted against the mounting surface 38 with its edge in engagement with the abutment 40 by a mounting screw 13. The backing plate 41 is of a wide flat construction, but any of the backing plates 11, 26 or 27 may alternately be attached to the mounting block 34. Furthermore, any of a nearly infinite variety of shapes and sizes of backing plates could be provided for easy demountable attachment to either of the handles 12 and 32 described herein.

Various modes of carrying out the present invention are contemplated as being within the scope of the following claims particularly pointing out and distinctly claiming the subject matter which is regarded as the invention.

We claim:

1. A welding tool particularly adapted for use in the repair of a hole in a metal panel, said tool comprising:
   a backing plate having a smooth heat resistant surface portion with a shape conforming to the surface of the metal panel and sized to bridge a portion of the hole in the panel;
   a handle attached to one edge of said backing plate for manually positioning and holding said plate against the surface of the panel;
   said handle including a metal core attached at one end to said backing plate and an insulating hand grip surrounding the opposite end of said metal core;
   removable fastening means for demountably attaching said backing plate to said handle; and
   a heat transfer barrier in said metal core between said one end and said hand grip, said barrier comprising a recessed portion in the outer surface of said core defining a region of circumferentially reduced cross section.

2. The apparatus as set forth in claim 1 wherein said region of reduced cross section comprises a circumferential annular recess in said core.

3. The apparatus as set forth in claim 2 wherein said circumferential annular recess is disposed under the hand grip and adjacent said one end of the core.

* * * * *